United States Patent
Tsai et al.

(10) Patent No.: US 12,342,381 B2
(45) Date of Patent: Jun. 24, 2025

(54) METHOD OF RANDOM ACCESS PROCEDURE AND RELATED DEVICE

(71) Applicant: SHARP KABUSHIKI KAISHA, Sakai (JP)

(72) Inventors: Hsin-Hsi Tsai, Taipei (TW); Chia-Hung Wei, Taipei (TW); Heng-Li Chin, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 42 days.

(21) Appl. No.: 17/149,031

(22) Filed: Jan. 14, 2021

(65) Prior Publication Data

US 2021/0227585 A1   Jul. 22, 2021

Related U.S. Application Data

(60) Provisional application No. 62/961,875, filed on Jan. 16, 2020.

(51) Int. Cl.
*H04W 74/0833* (2024.01)

(52) U.S. Cl.
CPC .............. *H04W 74/0833* (2013.01)

(58) Field of Classification Search
CPC .......... H04W 74/0833; H04W 74/006
See application file for complete search history.

(56) References Cited

U.S. PATENT DOCUMENTS

| 2012/0195291 A1* | 8/2012 | Kuo ................ H04W 4/06 370/336 |
| 2016/0262187 A1* | 9/2016 | Ohuchi ............ H04W 24/08 |
| 2019/0075598 A1 | 3/2019 | Li et al. |
| 2019/0132882 A1* | 5/2019 | Li ................ H04L 27/2605 |
| 2020/0314913 A1* | 10/2020 | Rastegardoost .. H04W 36/0064 |

(Continued)

FOREIGN PATENT DOCUMENTS

| CN | 110169186 A | 8/2019 |
| WO | 2019096036 A1 | 5/2019 |

OTHER PUBLICATIONS

Nokia "Feature lead summary#3 on 2 step RACH procedures", 3GPP R1-1907900, May 13-17, 2019 (Year: 2019).*

(Continued)

*Primary Examiner* — Chuong M Nguyen

(74) *Attorney, Agent, or Firm* — ScienBiziP, P.C.

(57) ABSTRACT

A method of a Random Access (RA) procedure performed by a User Equipment (UE) is provided. The method includes receiving a first Random Access Channel (RACH) configuration from a Base Station (BS), the first RACH configuration including a first parameter associated with a first maximum number of RA preamble transmissions, receiving a second RACH configuration for a 2-step RA type from the BS, initiating an RA procedure with an RA type set to the 2-step RA type, determining whether the second RACH configuration includes a second parameter associated with a second maximum number of RA preamble transmissions, applying the second parameter for the RA procedure in a case that the second parameter is included in the second RACH configuration, and applying the first parameter for the RA procedure in a case that the second parameter is not included in the second RACH configuration.

16 Claims, 4 Drawing Sheets

(56) References Cited

U.S. PATENT DOCUMENTS

| | | | | |
|---|---|---|---|---|
| 2020/0404711 | A1* | 12/2020 | Zhao | H04W 74/0836 |
| 2021/0176781 | A1* | 6/2021 | Wang | H04W 74/006 |
| 2021/0185733 | A1* | 6/2021 | Agiwal | H04W 72/0453 |
| 2022/0022251 | A1* | 1/2022 | Yang | H04L 5/0094 |
| 2022/0022259 | A1* | 1/2022 | Atungsiri | H04W 74/0833 |

OTHER PUBLICATIONS

Huawei "2-step RACH and preamble transmission counters", 3GPP R1-1910682, Aug. 26-30, 2019 (Year: 2019).*

CATT, "On NR RACH Preamble Design", R1-1707463, 3GPP TSG RAN WG1 Meeting #89, Hangzhou, P.R. China May 15-19, 2017.

3GPP TS 38.213, "3rd Generation Partnership Project; Technical Specification Group Radio Access Network; NR; Physical layer procedures for control (Release 15)", V15.7.0 (Sep. 2019).

3GPP TS 38.213, "3rd Generation Partnership Project; Technical Specification Group Radio Access Network; NR; Physical layer procedures for control (Release 15)", V15.8.0 (Dec. 2019).

3GPP TS 38.331, "3rd Generation Partnership Project; Technical Specification Group Radio Access Network; NR; Radio Resource Control (RRC) protocol specification (Release 15)", V15.7.0 (Sep. 2019).

3GPP TS 38.331, "3rd Generation Partnership Project; Technical Specification Group Radio Access Network; NR; Radio Resource Control (RRC) protocol specification (Release 15)", V15.8.0 (Dec. 2019).

3GPP TS 38.101-1, "3rd Generation Partnership Project; Technical Specification Group Radio Access Network; NR; User Equipment (UE) radio transmission and reception; Part 1: Range 1 Standalone (Release 15)", V15.8.2 (Dec. 2019).

3GPP TS 38.101-2, "3rd Generation Partnership Project; Technical Specification Group Radio Access Network; NR; User Equipment (UE) radio transmission and reception; Part 2: Range 2 Standalone (Release 15)", V15.8.0 (Dec. 2019).

3GPP TS 38.101-3, "3rd Generation Partnership Project; Technical Specification Group Radio Access Network; NR; User Equipment (UE) radio transmission and reception; Part 3: Range 1 and Range 2 Interworking operation with other radios (Release 15)", V15.7.0 (Sep. 2019).

3GPP TS 38.214, "3rd Generation Partnership Project; Technical Specification Group Radio Access Network; NR; Physical layer procedures for data (Release 15)", V15.8.0 (Dec. 2019).

3GPP TS 38.211, "3rd Generation Partnership Project; Technical Specification Group Radio Access Network; NR; Physical channels and modulation (Release 15)", V15.8.0 (Dec. 2019).

3GPP TS 38.300, "3rd Generation Partnership Project; Technical Specification Group Radio Access Network; NR; NR and NG-RAN Overall Description; Stage 2 (Release 15)", V15.7.0 (Sep. 2019).

3GPP TS 38.300, "3rd Generation Partnership Project; Technical Specification Group Radio Access Network; NR; NR and NG-RAN Overall Description; Stage 2 (Release 15)", V15.8.0 (Dec. 2019).

3GPP TS 38.321, "3rd Generation Partnership Project; Technical Specification Group Radio Access Network; NR; Medium Access Control (MAC) protocol specification (Release 15)", V15.7.0 (Sep. 2019).

3GPP TS 38.321, "3rd Generation Partnership Project; Technical Specification Group Radio Access Network; NR; Medium Access Control (MAC) protocol specification (Release 15)", V15.8.0 (Dec. 2019).

Ericsson, "Report on email [107bis#77] [2-step RACH] RRC details and running RRC CR", 3GPP TSG RAN WG2 #108, Reno, Nevada, US, Nov. 18-22, 2019, R2-1915787.

ZTE, "RRC parameters for Rel-16 NR 2-step RACH", 3GPP TSG RAN WG1 #98 Chongqing, China, Oct. 14-20, 2019, R1-1911582.

Huawei, Hisilicon, "2-step RACH and preamble transmission counters [online]", 3GPP TSG RAN WG2 #107, 3GPP, Aug. 30, 2019, R2-1910682.

ZTE, Sanechips, "Remaining issues of 2-step RACH procedures [online]", 3GPP TSG RAN WG1 #98bis, 3GPP, Oct. 20, 2019, R1-1910003.

* cited by examiner

METHOD OF RANDOM ACCESS PROCEDURE AND RELATED DEVICE

CROSS-REFERENCE TO RELATED APPLICATION(S)

The present disclosure claims the benefit of and priority to U.S. provisional Patent Application Ser. No. 62/961,875 filed on Jan. 16, 2020, entitled "Method and Apparatus for Configurations of 2-step and 4-step Random Access Procedures," (hereinafter referred to as "the '875 provisional"). The disclosure of the '875 provisional is hereby incorporated fully by reference into the present disclosure.

FIELD

The present disclosure is generally related to wireless communications, and, more specifically, to a method of a random access procedure and a related device.

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure provides methods of a Random Access (RA) procedure and a related device.

According to an aspect of the present disclosure, a method of an RA procedure performed by a User Equipment (UE) is provided. The method includes receiving a first Random Access Channel (RACH) configuration from a Base Station (BS), the first RACH configuration including a first parameter associated with a first maximum number of RA preamble transmissions, receiving a second RACH configuration for a 2-step RA type from the BS, initiating an RA procedure with an RA type set to the 2-step RA type, determining whether the second RACH configuration includes a second parameter associated with a second maximum number of RA preamble transmissions, applying the second parameter for the RA procedure in a case that the second parameter is included in the second RACH configuration, and applying the first parameter for the RA procedure in a case that the second parameter is not included in the second RACH configuration.

According to another aspect of the present disclosure, a UE for performing an RA procedure is provided. The UE includes a processor configured to execute a computer-executable program, and a memory, coupled to the processor and configured to store the computer-executable program, wherein the computer-executable program instructs the processor to perform the method.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

DESCRIPTION

Figure 1A:
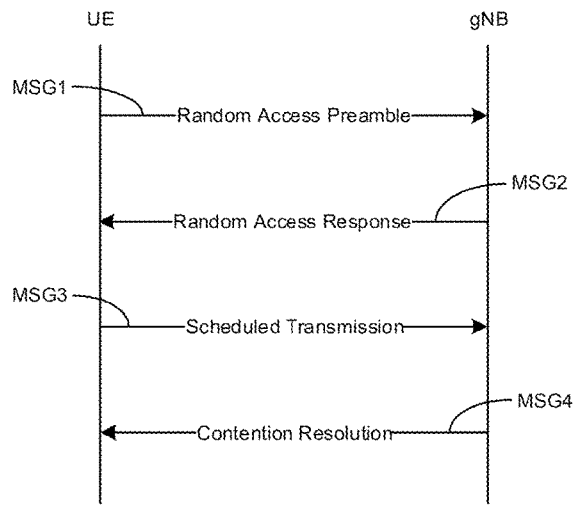
FIG. 1A to FIG. 1D are schematic diagrams illustrating Contention-Based (CB)/Contention-Free (CF) random access (RA) that includes 2-step RA procedure and 4-step RA procedure, according to an implementation of the present disclosure.

The following disclosure contains specific information pertaining to exemplary implementations in the present disclosure. The drawings and their accompanying detailed disclosure are directed to exemplary implementations. However, the present disclosure is not limited to these exemplary implementations. Other variations and implementations of the present disclosure will occur to those skilled in the art. Unless noted otherwise, like or corresponding elements in the drawings may be indicated by like or corresponding reference numerals. Moreover, the drawings and illustrations are generally not to scale and are not intended to correspond to actual relative dimensions.

For consistency and ease of understanding, like features are identified (although, in some examples, not shown) by reference designators in the exemplary drawings. However, the features in different implementations may be different in other respects, and therefore shall not be narrowly confined to what is shown in the drawings.

The phrases "in one implementation," and "in some implementations," may each refer to one or more of the same or different implementations. The term "coupled" is defined as connected, whether directly or indirectly via intervening components, and is not necessarily limited to physical connections. The term "comprising" may mean "including, but not necessarily limited to" and specifically indicate open-ended inclusion or membership in the disclosed combination, group, series, and equivalents.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists. Besides, the character "/" used herein generally represents that the former and latter associated objects are in an "or" relationship.

Additionally, any two or more of the following paragraphs, (sub)-bullets, points, actions, behaviors, terms, alternatives, examples, or claims in the present disclosure may be combined logically, reasonably, and properly to form a specific method. Any sentence, paragraph, (sub)-bullet, point, action, behaviors, terms, or claims in the present disclosure may be implemented independently and separately to form a specific method. Dependency, e.g., "based on", "more specifically", "preferably", "In one embodiment", "In one implementation", "In one alternative", in the present disclosure may refer to just one possible example that would not restrict the specific method.

For a non-limiting explanation, specific details, such as functional entities, techniques, protocols, standards, and the like, are set forth for providing an understanding of the disclosed technology. In other examples, detailed disclosure of well-known methods, technologies, systems, and architectures are omitted so as not to obscure the present disclosure with unnecessary details.

Persons skilled in the art will recognize that any disclosed network function(s) or algorithm(s) may be implemented by hardware, software, or a combination of software and hardware. Disclosed functions may correspond to modules that may be software, hardware, firmware, or any combination thereof. The software implementation may comprise computer-executable instructions stored on a computer-readable medium such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Applications Specific Integrated Circuitry (ASIC), programmable logic arrays, and/or using one or more Digital Signal Processors (DSPs). Although some of the disclosed implementations are directed to software installed and executing on computer hardware, nevertheless, alternative implementations as firmware or as hardware or combination of hardware and software are well within the scope of the present disclosure.

The computer-readable medium may include but may not be limited to Random Access Memory (RAM), Read-Only Memory (ROM), Erasable Programmable Read-Only Memory (EPROM), Electrically Erasable Programmable Read-Only Memory (EEPROM), flash memory, Compact Disc (CD) Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a New Radio (NR) system) may typically include at least one base station (BS), at least one UE, and one or more optional network elements that provide connection with a network. The UE may communicate with the network (e.g., a Core Network (CN), an Evolved Packet Core (EPC) network, an Evolved Universal Terrestrial Radio Access Network (E-UTRAN), a Next-Generation Core (NGC), a 5G Core (5GC), or an internet) via a Radio Access Network (RAN) established by one or more BSs.

A UE according to the present disclosure may include, but is not limited to, a mobile station, a mobile terminal or device, a user communication radio terminal. For example, a UE may be a portable radio equipment, that includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a node B (NB) as in the Universal Mobile Telecommunication System (UMTS), an evolved node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) RAN (GERAN), a next-generation eNB (ng-eNB) as in an Evolved Universal Terrestrial Radio Access (E-UTRA) BS in connection with the 5GC, a next-generation Node B (gNB) as in the 5G-RAN (or in the 5G Access Network (5G-AN)), and any other apparatus capable of controlling radio communication and managing radio resources within a cell. The BS may connect to serve the one or more UEs via a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GRPS), UMTS (often referred to as 3G) according to basic Wideband-Code Division Multiple Access (W-CDMA), High-Speed Packet Access (HSPA), LTE, LTE-A, enhanced LTE (eLTE), NR) (often referred to as 5G), and/or LTE-A Pro. However, the scope of the present disclosure is not limited to these protocols.

The BS may be operable to provide radio coverage to a specific geographical area using a plurality of cells forming the RAN. The BS may support the operations of the cells. Each cell may be operable to provide services to at least one UE within its radio coverage. More specifically, each cell (often referred to as a serving cell) may provide services to serve one or more UEs within its radio coverage, (e.g., each cell schedules the downlink (DL) and optionally UL resources to at least one UE within its radio coverage for DL and optionally UL packet transmissions). The BS may communicate with one or more UEs in the radio communication system via the plurality of cells.

A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be called as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), comprising the SpCell and optionally one or more Secondary Cells (SCells). An SCG may refer to a group of serving cells associated with the Secondary Node (SN), comprising of the SpCell and optionally one or more SCells.

As disclosed previously, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the 3rd Generation Partnership Project (3GPP), may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or the service applications.

Moreover, in a transmission time interval of a single NR frame, at least DL transmission data, a guard period, and UL transmission data should be included. The respective portions of the DL transmission data, the guard period, and the UL transmission data should also be configurable, for example, based on the network dynamics of NR. An SL resource may also be provided via an NR frame to support ProSe services or V2X services.

In NR, two types of Random Access (RA) procedure are supported:

(1) 4-step RA type (with MSG1 as an RA preamble transmission), which includes 4-step contention-free random access (CFRA) and 4-step contention-based random access (CBRA). 4-step CFRA may refer to CFRA with 4-step RA type. 4-step CBRA may refer to CBRA with 4-step RA type.

(2) 2-step RA type (with MSGA as an RA preamble transmission), which includes 2-step CFRA and 2-step CBRA. 2-step CFRA may refer to CFRA with 2-step RA type. 2-step CBRA may refer to CBRA with 2-step RA type. In one example, the 2-step CFRA may only be supported for a handover.

Both types of RA procedure support the CBRA and the CFRA. The UE may select the RA type of an RA procedure based on a network configuration and/or a Reference Signal Received Power (RSRP) of a DL pathloss reference.

In one implementation, the network may not configure the CFRA resources for 4-step and 2-step RA types at the same time for a Bandwidth Part (BWP). The CFRA resources are not configured, an RSRP threshold may be used by the UE to select between the 2-step RA type and the 4-step RA type, and/or the UE may perform CBRA with 2-step RA type or 4-step RA type based on the selection of RA type. In some implementations, when the CFRA resources for 4-step RA type are configured, the UE may select the 4-step RA type and/or performs RA procedure with the 4-step RA type. In some implementations, when the CFRA resources for 2-step RA type are configured, the UE may select the 2-step RA type and/or performs an RA procedure with the 2-step RA type.

FIGS. 1A-1D are schematic diagrams illustrating CB/CF RA that includes the 2-step RA procedure and the 4-step RA procedure, according to an implementation of the present disclosure. Some signaling of the 2-step RA procedure and 4-step RA procedure are disclosed as follows.

MSG1: an RA preamble transmission of the 4-step RA procedure, as illustrated in FIG. 1A.

MSG2: a Random Access Response (RAR) of the 4-step RA procedure. The RAR may be a response to the MSG1 in the 4-step RA procedure, as illustrated in FIG. 1A.

MSG3: a scheduled transmission of a message on an Uplink Shared Channel (UL-SCH) containing a Cell Radio Network Temporary Identifier (C-RNTI) Medium Access Control (MAC) Control Element (CE) or Common Control Channel (CCCH) Service Data Unit (SDU), submitted from an upper layer and associated with a UE contention resolution identity, as a part of the 4-step RA procedure illustrated in FIG. 1A.

MSG4: a Physical Downlink Control Channel (PDCCH) transmission for a contention resolution in the 4-step RA procedure. If the UE considers the contention resolution of the 4-step RA procedure is successful, the UE may determine that the 4-step RA procedure is successfully completed.

Figure 1B:
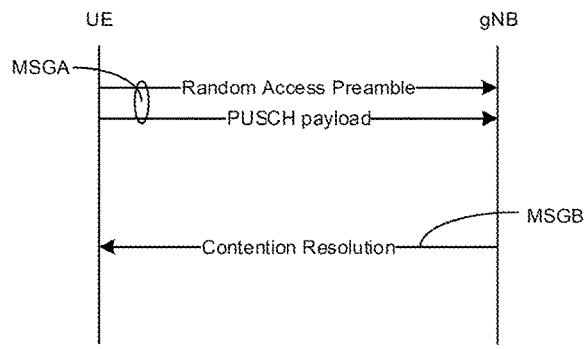

MSGA: preamble and/or payload transmissions of the 2-step RA procedure, as illustrated in FIG. 1B.

MSGB: a response to the MSGA in the 2-step RA procedure. The MSGB may include response(s) for a contention resolution, a fallback indication(s), and/or a backoff indication, as illustrated in FIG. 1B.

In FIGS. 1A and 1B, the 4-step CBRA and the 2-step CBRA are disclosed. The UE may select one preamble among a group of preambles. Then, the UE may transmit the selected RA preamble at least once in the beginning of the 4-step CBRA/2-step CBRA. After the UE transmits the selected RA preamble (e.g., the MSG1/MSGA), the UE may monitor DL channels (e.g., PDCCH) for the RAR (e.g., the MSG2/MSGB) within a pre-defined time internal (e.g., a response window in a time domain). When the contention resolution is received via the MSG4 of the 4-step CBRA or the MSGB of the 2-step CBRA and the contention resolution is considered successful, the UE determines that the 4-step CBRA/2-step CBRA procedure successfully completed.

Figure 1C:
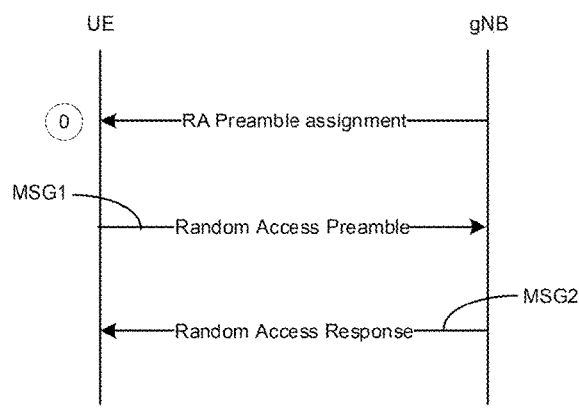
Figure 1D:
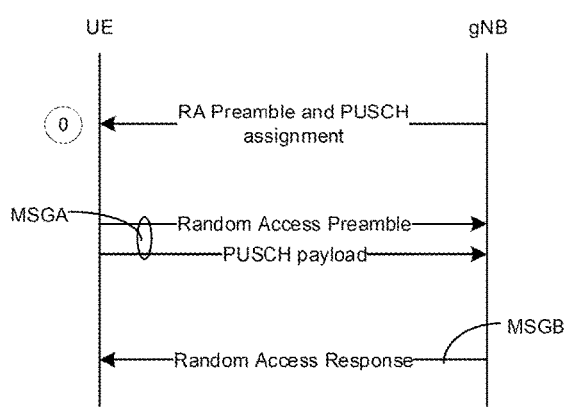

In FIGS. 1C and 1D, the 4-step CFRA and the 2-step CFRA are disclosed. For the 4-step CFRA, the MSG1 of the 4-step CFRA includes the assigned preamble that is pre-configured by the gNB (e.g., step 0 of FIG. 1C). The UE transmits the MSG1 to the gNB, and then monitors the RAR from the gNB within a pre-defined time internal (e.g., a response window in a time domain). For the 2-step CFRA, the MSGA of the 2-step CFRA includes the assigned preamble on Physical Random Access Channel (PRACH) and a payload on Physical Uplink Shared Channel (PUSCH), where the assigned preamble is pre-configured by the gNB (e.g., step 0 of FIG. 1D). After the UE transmits the MSGA to the gNB, the UE monitors DL channels (e.g., PDCCH) for the RAR from the gNB within a pre-defined time internal (e.g., a response window in a time domain). When the UE receives the RAR (e.g., the MSG2 of FIG. 1C or MSGB of FIG. 1D), the UE determines that the 4-step CFRA/2-step CFRA procedure successfully completed.

Figure 2:
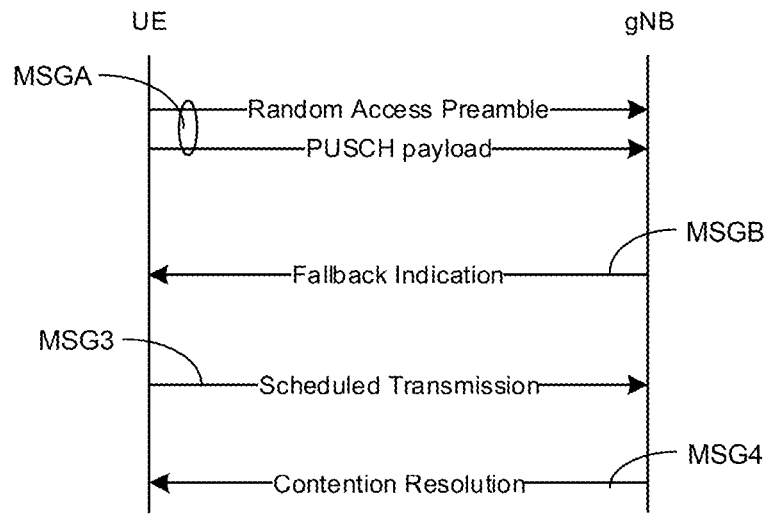
FIG. 2 is a schematic diagram illustrating an RA procedure with fallback indication, according to an implementation of the present disclosure.

FIG. 2 is a schematic diagram illustrating an RA procedure with fallback indication, according to an implementation of the present disclosure. As illustrated in FIG. 2, after the UE receives the MSGB with the fallback indication, the UE transmits the MSG3 to the gNB, and then monitors the contention resolution via the MSG4. If the contention resolution in the MSG4 is not successful or the MSG4 is not received (e.g., after the MSG3 transmission), the UE may perform the MSGA transmission of the 2-step RA procedure. However, if the 2-step RA procedure is not completed after a number of the MSGA transmissions, the UE may set/switch the RA type to the 4-step RA type and perform the 4-step RA procedure.

Moreover, for random access in a cell that is configured with Supplementary Uplink (SUL), the network (e.g., gNB) may explicitly signal which carrier to use (UL or SUL). Otherwise, the UE selects an SUL carrier if the measured quality of a DL is lower than a broadcast threshold. The UE may perform carrier selection before the RA type selection (e.g., selecting between the 2-step RA type and the 4-step RA type). The RSRP threshold for selecting between the 2-step RA type and the 4-step RA type may be configured separately for UL and SUL. Once the RA procedure is initiated, all UL transmissions of the RA procedure remain on the selected carrier.

When Carrier Aggregation (CA) is configured to the UE, the UE may perform the 2-step RA procedure only on the PCell. On the other hand, for the 4-step RA procedure, the first three steps of the CBRA (e.g., MSG1-MSG3 transmissions) always occur on the PCell, whereas the contention resolution (e.g., MSG4 transmission) may be cross-scheduled by the PCell. However, the three steps of the CFRA performed on the PCell may remain on the PCell. It is noted that the CFRA on the SCell may be initiated by the gNB to establish a timing alignment for a secondary timing advance group (TAG).

In one example, the CFRA on the SCell is initiated by the gNB with a PDCCH order (e.g., RA preamble assignment in step 0 of FIG. 1C) that is sent on a scheduling cell of an activated SCell of the secondary TAG, the RA preamble transmission (e.g., MSG1 of FIG. 1C) is performed on the indicated SCell, and the RAR (MSG2 of FIG. 1C) is transmitted on the PCell. The RA procedure may be triggered by at least one event that includes an initial access from an RRC_IDLE state, an RRC Connection Re-establishment procedure, DL or UL data arrival during an RRC CONNECTED state when a UL synchronization status is set to non-synchronized, UL data arrival during an RRC_CONNECTED state when no physical uplink control channel (PUCCH) resources is available for a Scheduling Request (SR), SR failure, a request by a RRC layer upon synchronous reconfiguration (e.g. handover), transition from an RRC_INACTIVE state, time alignment for a secondary TAG, a request for other SI, and beam failure recovery.

For 2-step RA procedure, several features are disclosed.
1. RACH configurations for the 2-step RA type (e.g., a 2-step RA resource is configured in a RACH configuration) and/or the 4-step RA type (e.g., a 4-step RA resource is configured in a RACH configuration) from which the UE to select (e.g., RA type selection) may be indicated to all UEs via a system information block (SIB), or to a specific UE via a dedicated signaling in an RRC_CONNECTED/INACTIVE/IDLE states.
2. the UE may retry the MSGA transmission (e.g., preamble and payload) of the 2-step RA procedure if the UE does not receive the MSGB within a response window.
3. for the MSGA with a C-RNTI, the UE may monitor the PDCCH addressed to the C-RNTI for success response and/or PDCCH addressed to the MSGB-RNTI.
4. for the contention resolution of the 2-step RA procedure, if a Protocol Data Unit (PDU) indicated by the PDCCH addressed to the C-RNTI (e.g., C-RNTI included in the MSGA) containing the 12-bit TA command (TAC) is received, the UE may consider that the contention resolution of the 2-step RA procedure is successful and stop the reception of the MSGB or with an UL grant if the UE is synchronized already. On the other hand, if the RAR (e.g., MSGB) with the fallback indication is received, the UE may stop monitoring the PDCCH addressed to the C-RNTI and perform the fallback procedure (e.g., performs the MSG3 transmission). It is noted that if neither the RAR with the fallback indication nor PDCCH addressed to the C-RNTI is received within the response window as mentioned above, the UE may consider that the MSGA transmission is failed, and thus perform a backoff procedure based on the backoff indication received via the MSGB.
5. a response (e.g., the MSGB/MSG2) from a network to the MSGA may include the successRAR, the fallbackRAR, and/or the backoff indication.
6. the fields, such as Contention resolution ID, C-RNTI, and/or TAC, may be included in the successRAR when a CCCH message is included in the MSGA.
7. when the UE receives the fallbackRAR, the UE may transmit the MSG3 of the 4-step RA procedure. In one example, the fallbackRAR may include the following fields: RAPID, UL grant (to retransmit the payload of the MSGA), Temporary Cell RNTI (TC-RNTI), and/or TAC.
8. RA type selection (e.g., to select/set the 2-step RA type or the 4-step RA type) is performed by the UE before beam selection.
9. the network (e.g., gNB) may configure the number of times 'N' to the UE, so the UE may retransmit the MSGA for 'N' times during the RA procedure.
10. if the UE is configured with 2-step RA type and the measured RSRP is above a configurable threshold, the UE performs the 2-step RA procedure. In one example, the RACH configuration for the 2-step RA type (e.g., 2-step RA resources are configured in the RACH configuration, where the 2-step RA resources may include 2-step CBRA resources and 2-step CFRA resources) can only be configured on the SpCell. In some examples, the 2-step RA resources may be configured on a BWP where the 4-step CBRA resources are not configured. In this case, the UE may not switch to the 4-step RA type.
11. if no qualified beam with the 4-step CFRA resources is found, the UE may perform the 4-step CBRA.
12. for an RA procedure initiated by a PDCCH order, if the PDCCH order includes non-zero RA preamble index, the UE may perform the 4-step CFRA.
13. HARQ process ID '0' may be used for the MSGA PUSCH transmission.

Moreover, for the 2-step CFRA, several features are disclosed.
1. the 2-step CFRA may be triggered for handover.
2. the 2-step CFRA resources and 4-step CFRA resources may not be configured simultaneously for a BWP.
3. for the 2-step CFRA that is triggered for the handover, the UE may monitor the PDCCH of the target cell for a response (e.g., the MSGB) identified by the C-RNTI from the gNB when the msgB-ResponseWindow (configured via the 2-step RA resources) is running. The RA procedure is considered successful upon reception of a transmission addressed to the C-RNTI containing at least the 12-bit TAC MAC CE.
4. once MSGA is transmitted, the UE may monitor the PDCCH scrambled by MSGB-RNTI.
5. the UE may always determine the RA type of an RA procedure to be the 2-step RA type if the 2-step CFRA resources are configured via a handover command (HO).
6. similar to the 4-step RA procedure, the UE may search for a suitable CFRA beam with the 2-step CFRA resources.
7. SSB and/or CSI-RS based 2-step CFRA may be supported.
8. the PUSCH resource for the 2-step CFRA associated with the dedicated preamble may be configured to the UE via a dedicated signaling (e.g., not included in SIB1).
9. the 2-step CFRA resources are configured only on a BWP where the 2-step CBRA resources are configured.

The UE may perform the detection for a radio link failure (RLF) as follows:

The UE may:
1> upon T310 expiry in PCell; or
1> upon RA problem indication from MCG MAC while neither T300, T301, T304, T311 nor T319 are running; or
1> upon indication from MCG RLC that the maximum number of retransmissions has been reached:

2> if the indication is from MCG RLC and CA duplication is configured and activated, and for the corresponding logical channel allowedServingCells only includes SCell(s):
  3> initiate the failure information procedure to report RLC failure.
2> else:
  3> consider the RLF to be detected on the MCG (e.g., MCG RLF);
  3> if AS security has not been activated:
    4> perform the actions upon going to RRC_IDLE, with release cause 'other';
  3> else if AS security has been activated but SRB2 and at least one DRB have not been setup:
    4> perform the actions upon going to RRC_IDLE, with release cause 'RRC connection failure';
  3> else:
    4> initiate the connection re-establishment procedure.

The UE shall:
1> upon T310 expiry in PSCell; or
1> upon RA problem indication from SCG MAC; or
1> upon indication from SCG RLC that the maximum number of retransmissions has been reached:
  2> if the indication is from SCG RLC and CA duplication is configured and activated; and for the corresponding logical channel allowedServingCells only includes SCell(s):
    3> initiate the failure information procedure to report RLC failure.
  2> else:
    3> consider the RLF to be detected on the SCG (e.g., SCG RLF);
    3> initiate the SCG failure information procedure to report SCG RLF.

Configurations of 4-Step RA Procedure and 2-Step RA Procedure

For each UL BWP, a UE may be configured with a RACH configuration for the 4-step RA type (e.g., via rach-ConfigCommon and/or rach-ConfigGeneric), and/or a RACH configuration for the 2-step RA type (e.g., via rach-ConfigCommonTwoStepRA and/or rach-ConfigGenericTwoStepRA).

The "BWP-UplinkCommon" information element (IE) may be used for configuring common parameters of an UL BWP, as illustrated in Table 1 and Table 2.

TABLE 1

| BWP-UplinkCommon information element | |
|---|---|
| BWP-UplinkCommon ::= | SEQUENCE { |
| genericParameters | BWP, |
| rach-ConfigCommon OPTIONAL, -- Need M | SetupRelease { RACH-ConfigCommon } |
| pusch-ConfigCommon OPTIONAL, -- Need M | SetupRelease { PUSCH-ConfigCommon } |
| pucch-ConfigCommon OPTIONAL, -- Need M | SetupRelease { PUCCH-ConfigCommon } |
| ..., [[ | |
| rach-ConfigCommonTwoStepRA-r16 } OPTIONAL, -- Need M | SetupRelease { RACH-ConfigCommonTwoStepRA-r16 } |
| msgA-PUSCH-Config-r16 OPTIONAL -- Need M | SetupRelease { MsgA-PUSCH-Config-r16 } |
| ]] } | |

TABLE 2

| BWP-UplinkCommon field descriptions |
|---|
| rach-ConfigCommon |
| Configuration of cell specific RA parameters which the UE uses for CBRA and CFRA as well as for contention based beam failure recovery in this BWP. The NW configures SSB-based RA (and hence RACH-ConfigCommon) only for UL BWPs if the linked DL BWPs (same bwp-Id as UL-BWP) are the initial DL BWPs or DL BWPs containing the SSB associated to the initial DL BWP. The network configures rach-ConfigCommon, whenever it configures CFRA (for reconfiguration with synchronization or for beam failure recovery). |
| rach-ConfigCommonTwoStepRA |
| Configuration of cell specific RA parameters which the UE uses for 2-step CBRA and 2-step CFRA as well as for contention based beam failure recovery in this BWP. The NW configures SSB-based RA (and hence RACH-ConfigCommonTwoStepRA) only for UL BWPs if the linked DL BWPs (same bwp-Id as UL-BWP) are the initial DL BWPs or DL BWPs containing the SSB associated to the initial BL BWP. The network configures rach-ConfigCommonTwoStepRA whenever it configures CFRA with 2-step RA type (for reconfiguration with synchronization). |

In the "RACH-ConfigCommon" IE, the BWP of the UE may be configured with the "rach-ConfigGeneric" parameter, as illustrated in Table 3 and Table 4.

TABLE 3

RACH-ConfigCommon information element

```
RACH-ConfigCommon ::=          SEQUENCE {
  rach-ConfigGeneric           RACH-ConfigGeneric,
  totalNumberOfRA-Preambles    INTEGER (1 . . . 63)
OPTIONAL,    -- Need S
  ssb-perRACH-OccasionAndCB-PreamblesPerSSB     CHOICE {
    oneEighth                  ENUMERATED
{n4,n8,n12,n16,n20,n24,n28,n32,n36,n40,n44,n48,n52,n56,n60,n64},
    oneFourth                  ENUMERATED
{n4,n8,n12,n16,n20,n24,n28,n32,n36,n40,n44,n48,n52,n56,n60,n64},
    oneHalf                    ENUMERATED
{n4,n8,n12,n16,n20,n24,n28,n32,n36,n40,n44,n48,n52,n56,n60,n64},
    one                        ENUMERATED
{n4,n8,n12,n16,n20,n24,n28,n32,n36,n40,n44,n48,n52,n56,n60,n64},
    two                        ENUMERATED
{n4,n8,n12,n16,n20,n24,n28,n32},
    four                       INTEGER (1 . . . 16),
    eight                      INTEGER (1 . . . 8),
    sixteen                    INTEGER (1 . . . 4)
  }
OPTIONAL,    -- Need M
  groupBconfigured             SEQUENCE {
    ra-Msg3 SizeGroupA         ENUMERATED {b56, b144, b208,
b256, b282, b480, b640,
                                            b800, b1000, b72, spare6, spare5,
spare4, spare3, spare2, spare1 },
    messagePowerOffsetGroupB   ENUMERATED { minusinfinity, dB0,
dB5, dB8, dB10, dB12, dB15, dB18},
    numberOfRA-PreamblesGroupA INTEGER (1 . . . 64)
  }
OPTIONAL,    -- Need R
  ra-ContentionResolutionTimer ENUMERATED { sf8, sf16, sf24, sf32, sf40,
sf48, sf56, sf64},
  rsrp-ThresholdSSB            RSRP-Range
OPTIONAL,    -- Need R
  rsrp-ThresholdSSB-SUL        RSRP-Range
OPTIONAL,    -- Cond SUL
  prach-RootSequenceIndex      CHOICE {
    1839                       INTEGER (0 . . . 837),
    1139                       INTEGER (0 . . . 137)
  },
  msg1-SubcarrierSpacing       SubcarrierSpacing
OPTIONAL,    -- Cond L139
  restrictedSetConfig          ENUMERATED {unrestrictedSet,
restrictedSetTypeA, restrictedSetTypeB},
  msg3-transformPrecoder       ENUMERATED {enabled}
OPTIONAL, -- Need R
  . . .
}
```

TABLE 4

RACH-ConfigCommon field descriptions rach-ConfigGeneric
RACH parameters for both regular random access
and beam failure recovery.

In the "RACH-ConfigCommonTwoStepRA" IE, the BWP of the UE may be configured with the "rach-ConfigGenericTwoStepRA-r16" parameter, as illustrated in Table 5 and Table 6.

TABLE 5

RACH-ConfigCommonTwoStepRA information element

```
RACH-ConfigCommonTwoStepRA-r16 ::=    SEQUENCE {
rach-ConfigGenericTwoStepRA-r16       RACH-ConfigGeneric-r16,
msgA-TotalNumberOfRA-Preambles-r16    INTEGER (1 . . . 63)
           OPTIONAL,    -- Need S
ssb-perRACH-OccasionAndCB-PreamblesPerSSB-TwoStepRA-r16         SEQUENCE
{
   oneEighth                          ENUMERATED
{n4,n8,n12,n16,n20,n24,n28,n32,n36,n40,n44,n48,n52,n56,n60,n64},
```

TABLE 5-continued

RACH-ConfigCommonTwoStepRA information element

```
    oneFourth                        ENUMERATED
{n4,n8,n12,n16,n20,n24,n28,n32,n36,n40,n44,n48,n52,n56,n60,64},
    oneHalf                          ENUMERATED
{n4,n8,n12,n16,n20,n24,n28,n32,n36,n40,n44,n48,n52,n56,n60,64},
    one                              ENUMERATED
{n4,n8,n12,n16,n20,n24,n28,n32,n36,n40,n44,n48,n52,n56,n60,64},
    two                              ENUMERATED
{n4,n8,n12,n16,n20,n24,n28,n32},
        four                             INTEGER {1 ... 16},
        eight                            INTEGER { 1 ... 8},
        sixteen                          INTEGER { 1 ... 4}
    }
        OPTIONAL, -- Need S
    msgA-CB-PreamblesPerSSB-r16      INTEGER (1 ... 64)
OPTIONAL, -- Need S,
    msgA-SSB-sharedRO-MaskIndex-r16      INTEGER (1 ... 15)
            OPTIONAL, -- Need S
    preambleGroupingIdleInactive     MsgA-PreambleGrouping
            OPTIONAL, -- Need R
    preambleGroupingConnected        MsgA-PreambleGrouping
            OPTIONAL, -- Need R
    msgA-PRACH-RootSequenceIndex-r16     CHOICE {
        1839                             INTEGER (0 ... 837),
        1139                             INTEGER (0 ... 137)
    }
            OPTIONAL, -- Need S
    rsrp-ThresholdTwoStepRA-r16      RSRP-Range
OPTIONAL, -- Need S
    rsrp-ThresholdTwoStepRA-SUL-r16      RSRP-Range
OPTIONAL, -- Cond SUL
    msgA-SubcarrierSpacing-r16       SubcarrierSpacing
OPTIONAL, -- Cond L139
    msgA-RestrictedSetConfig-r16     ENUMERATED {unrestrictedSet,
restrictedSetTypeA,
                                        restrictedSetTypeB}
            OPTIONAL, -- Need S
    ra-PrioritizationForAccessIdentity-r16   SEQUENCE {
        ra-Prioritization-r16            RA-Prioritization,
        ra-PrioritizationForAI-r16       BIT STRING (SIZE (2))
    }
OPTIONAL, -- Need R
    ...
}
MsgA-PreambleGrouping ::= SEQUENCE {
    ra-MsgA-SizeGroupA               ENUMERATED {b56, b144, b208, b256, b282,
b480, b640, b800,
                                        b1000, b72, spare6, spare5, spare4, spare3,
spare2, spare1 } OPTIONAL, -- Need M
    messagePowerOffsetGroupB         ENUMERATED { minusinfinity, dB0,
dB5, dB8, dB10, dB12, dB15, dB18}    OPTIOMAL, -- Need M
    numberofRA-PreamblesGroupA       INTEGER (1 ... 64),
    numberofRA-PreamblesGroupB       INTEGER (1 ... 64)
                OPTIONAL, -- Need M
msgA-PUSCH-ResourceIdGroupA
                                    MsgA-PUSCH-ResourceId,
    msgA-PUSCH-ResourceIdGroupB      MsgA-PUSCH-ResourceId
            OPTIONAL, -- Need M
}
```

TABLE 6

RACH-ConfigCommonTwoStepRA field descriptions rach-ConfigGeneric TwoStepRA
2-step RA type parameters for both regular random access
and beam failure recovery.

The "RACH-ConfigGeneric" IE may be used to specify the RA parameters both for regular RA procedure (e.g., the 4-step RA procedure or the 2-step RA procedure) as well as for beam failure recovery, as illustrated in Table 7.

TABLE 7

| RACH-ConfigGeneric information element |
|---|

```
RACH-ConfigGeneric ::=      SEQUENCE {
  prach-ConfigurationIndex    INTEGER (0 . . . 255),
  msg1-FDM                    ENUMERATED {one, two, four, eight},
  msg1-Frequency Start        INTEGER (0 . . . maxNrofPhysicalResourceBlocks−1),
  zeroCorrelationZoneConfig   INTEGER(0 . . . 15),
  preambleReceivedTargetPower  INTEGER (−202 . . . −60),
  preamble TransMax           ENUMERATED {n3, n4, n5, n6, n7, n8, n10, n20,
n50, n100, n200},
  powerRampingStep            ENUMERATED {dB0, dB2, dB4, dB6},
  ra-ResponseWindow           ENUMERATED {sl1, sl2, sl4, sl8, sl10, sl20, sl40,
sl80},
  . . .
}
```

The "RACH-ConfigGenericTwoStepRA" IE may be used to specify the 2-step RA type parameters, as illustrated in Table 8.

TABLE 8

| RACH-ConfigGeneric TwoStepRA information element |
|---|

```
RACH-ConfigGenericTwoStepRA-r16 ::=   SEQUENCE {
  msgA-PRACH-ConfigurationIndex-r16     INTEGER (0 . . . 255)
OPTIONAL,    -- Need S
  msgA-RO-FDM-r16                          ENUMERATED {One, Two, Four,
Eight}            OPTIONAL,   -- Need S
  msgA-RO-FrequencyStart-r16            INTEGER
(0 . . . maxNrofPhysicalResourceBlocks−1)  OPTIONAL, -- Need S
  msgA-ZeroCorrelationZoneConfig-r16    INTEGER (0 . . . 15)
       OPTIONAL, -- Need S
  msgA-TransMax-r16                     ENUMERATED {n1, n2, n4, n6, n8, n10,
n20, n50, n100, n200, infinity},
  msgA-PreamblePowerRampingStep-r16     ENUMERATED {dB0, dB2, dB4, dB6}
                       OPTIONAL, -- Need S
  msgB-ResponseWindow-r16               ENUMERATED {sl1, sl2, sl4, sl8, sl10,
sl20, sl40, sl80, sl160, sl320},
  msgA-PRACH-ConfigurationIndexNew-r16  INTEGER (256 . . . 262)
OPTIONAL, -- Need S
 . . .
```

For 4-step RA procedure and/or 2-step RA procedure, the UE may be configured with a first parameter (e.g., 'preambleTransMax') to indicate the maximum number of RA preamble (or MSG1) transmissions performed before declaring a failure (e.g., RLF) and/or declaring an RA problem for (4-step and/or 2-step) RA procedure.

For 4-step RA procedure and/or 2-step RA procedure, the UE may be configured with a second parameter (e.g., 'msgA-TransMax') to indicate the maximum number of MSGA transmissions performed before switching/setting to the 4-step RA type. The second parameter may only be applicable when the 2-step and 4-step RA type are configured and switching to the 4-step RA type is supported. If the second parameter is absent, switching from the 2-step RA type to the 4-step RA type is not allowed.

The RRC parameter, 'preambleTransMax', may be used to define the maximum number of preamble transmissions (e.g., the MSG1 and/or the MSGA) performed before declaring a failure (e.g., the RLF) or declaring an RA problem for an RA procedure. For example, if the UE determines that the value of a preamble transmission counter reaches to the value of 'preambleTransMax' (e.g., if PREAMBLE_TRANSMISSION_COUNTER=preamble TransMax+1), the lower layer (e.g., MAC layer) of the UE may indicate an RA problem to an upper layer (e.g., RRC layer), and/or the UE may consider the RA procedure unsuccessfully completed. Moreover, the UE may determine/consider a RLF is detected when declaring the RA problem (e.g., upon the upper layer receives the RA problem indication from the lower layer). In addition, the RRC parameter, 'msgA-TransMax', may be used to define the maximum number of MSGA transmissions performed before switching from the 2-step RA type to the 4-step RA type or declaring an RA problem for an RA procedure.

For example, in a case that the 'msgA-TransMax' is included in the "RACH-ConfigCommonTwoStepRA" IE and/or "RACH-ConfigGenericTwoStepRA" IE, the UE may apply the 'msgA-TransMax' for the 2-step RA procedure. In addition, the UE may set the RA_TYPE to 4-stepRA if 'msgA-TransMax' is applied and the value of the preamble transmission counter reaches value to the of 'msgA-TransMax' (e.g., PREAMBLE_TRANSMISSION_COUNTER=msgA-TransMax+1). On the other hand, in a case that the UE does not apply the 'msgA-TransMax' for the 2-step RA procedure or the value of the preamble transmission counter does not reach to the value of 'msgA-TransMax', the UE may not set the RA_TYPE to 4-stepRA even if the 'msgA-TransMax' is configured (e.g., the 'msgA-TransMax' is included in the "RACH-ConfigCommonTwoStepRA" IE and/or "RACH-ConfigGenericTwoStepRA" IE). Moreover, the UE may perform the RA resource selection procedure for the 2-step RA type.

It is noted that the UE may apply the 'msgA-TransMax' for the 2-step RA procedure if the 2-step RA type (e.g., RACH-ConfigCommonTwoStepRA) and 4-step RA type (e.g., RACH-ConfigCommon) are both configured to the UE (e.g., switching to 4-step RA type is supported). If the 'msgA-TransMax' is absent, switching from the 2-step RA type to the 4-step RA type may be not allowed.

The 'preambleTransMax' may be configured in "RACH-ConfigGeneric" IE (e.g., included in "RACH-ConfigCommon" IE) and/or may be configured in "RACH-ConfigGenericTwoStepRA" IE (e.g., included in "RACH-ConfigCommonTwoStepRA"), The 'msgA-TransMax' may be configured in "RACH-ConfigGenericTwoStepRA" IE (e.g., included in "RACH-ConfigCommonTwoStepRA".

In one implementation, an UL BWP of a UE may only be configured with the 2-step RA type (e.g., configured with "RACH-ConfigCommonTwoStepRA" and/or "RACH-ConfigGenericTwoStepRA" IE) but not configured with the 4-step RA type (e.g., configured with "RACH-ConfigCommon" IE and/or "RACH-ConfigGeneric" IE). In this case, the 'preambleTransMax' for may not be configured in the "RACH-ConfigCommon" IE and/or "RACH-ConfigGeneric" IE to the UE.

In one implementation, an UL BWP of a UE may be configured with both 2-step RA type (e.g., configured with "RACH-ConfigCommonTwoStepRA" and/or "RACH-ConfigGenericTwoStepRA" IE) and the 4-step RA type (e.g., configured with "RACH-ConfigCommon" IE and/or "RACH-ConfigGeneric" IE). Furthermore, it is possible that the 'preambleTransMax' may only be configured for 4-step RA type (e.g., via "RACH-ConfigGeneric" IE) but not configured for 2-step RA type (e.g., via "RACH-ConfigGenericTwoStepRA" IE).

It is noted that after the UE initiates an RA procedure with an RA type set to 2-step RA type, the UE may determine whether the 'preambleTransMax' an is included in "RACH-ConfigGenericTwoStepRA" IE (e.g., included in the "RACH-ConfigCommonTwoStepRA" IE). The UE may apply the 'preambleTransMax' included in "RACH-ConfigGenericTwoStepRA" IE for the RA procedure when the UE determines that the "RACH-ConfigGenericTwoStepRA" IE includes the 'preambleTransMax'. Otherwise, the UE may apply the 'preambleTransMax' included in the "RACH-ConfigGeneric" IE for the RA procedure when the UE determines that the "RACH-ConfigGenericTwoStepRA" IE does not include the 'preambleTransMax'.

It is noted that the UE may declare an RA problem by comparing the value of a preamble transmission counter with 'preambleTransMax' when the UE performs an RA procedure. The UE may set the value of the preamble transmission counter to '1' when the RA procedure (e.g., 2-step RA procedure or 4-step RA procedure) is initiated. If the 'preambleTransMax' for the 2-step RA type is not configured to the UE, the UE may not indicate an RA problem (from a lower layer of the UE to a higher layer of the UE), and the UE may (re-) attempt the preamble transmission (e.g., the MSGA) in the 2-step RA procedure without limitation. The fallback procedure (e.g., trigger by the RLF and/or RRC connection re-establishment, etc.) may be relied on T310. In order to increase the reliability of the 2-step RA procedure, one or more alternatives are disclosed.

In one alternative, the network may configure 'preambleTransMax' for the 2-step RA type (e.g., 'preambleTransMax' in the "RACH-ConfigGenericTwoStepRA" IE as illustrated in Table 9) to the UE, where the 'preambleTransMax' for the 2-step RA type may be different from the 'preambleTransMax' for the 4-step RA type. In other words, the parameter 'preambleTransMax' for the 2-step RA type (which is included in the "RACH-ConfigGenericTwoStep" IE) may be a different parameter from the 'preambleTransMax' for the 4-step RA type (which is included in the "RACH-ConfigGeneric" IE) More specifically, the 'preambleTransMax' in the "RACH-ConfigGenericTwoStepRA" IE may only be used for the 2-step RA type (e.g., not used for the 4-step RA type).

Thus, when the UE performs the 2-step RA procedure (e.g., RA_TYPE is set to 2-stepRA), the UE may apply the 'preambleTransMax' configured in the "RACH-ConfigGenericTwoStepRA" IE. The UE may not apply the 'preambleTransMax' configured in the "RACH-ConfigGeneric" IE. However, the UE may apply the 'preambleTransMax' included in the "RACH-ConfigGeneric" IE for the 2-step RA procedure when the UE determines that the "RACH-ConfigGenericTwoStepRA" IE does not include the 'preambleTransMax'.

TABLE 9

RACH-ConfigGenericTwoStepRA information element

```
RACH-ConfigGenericTwoStepRA-r16 ::=     SEQUENCE {
    msgA-PRACH-ConfigurationIndex-r16       INTEGER (0 . . . 255)
    OPTIONAL, -- Need S
    msgA-RO-FDM-r16                         ENUMERATED {One, Two, Four,
Eight}                           OPTIONAL,   -- Need S
    msgA-RO-FrequencyStart-r16              INTEGER
(0 . . . maxNrofPhysicalResourceBlocks-1)           OPTIONAL, -- Need S
    msgA-ZeroCorrelationZoneConfig-r16      INTEGER (0 . . . 15)
                                 OPTIONAL,   -- Need S
    msgA-TransMax-r16                       ENUMERATED {n1, n2, n4, n6, n8, n10,
n20, n50, n100, n200, infinity },
    msgA-PreamblePowerRampingStep-r16       ENUMERATED {dB0, dB2, dB4,
dB6}                             OPTIONAL, -- Need S
    msgB-ResponseWindow-r16                 ENUMERATED {sl1, sl2, sl4, sl8, sl10,
sl20, sl40, sl80, sl160, sl320},
    msgA-PRACH-ConfigurationIndexNew-r16 INTEGER (256 . . . 262)
    OPTIONAL, -- Need S           preambleTransMax
ENUMERATED {n3, n4, n5, n6, n7, n8, n10, n20, n50, n100, n200},
. . .

}
```

In one example, when the UE performs the 2-step RA procedure (e.g., RA_TYPE is set to 2-stepRA), and the preamble transmission counter reaches to the value of 'preambleTransMax', the lower layer (e.g., the MAC layer) of the UE may indicate an RA problem to the upper layer (e.g., the RRC layer) of the UE, where the 'preambleTransMax' may be configured in the "RACH-ConfigGenericTwoStepRA" IE and/or in the "RACH-ConfigGeneric" IE.

More specifically, the UE may declare the RA problem for the 2-step RA procedure that is different from the RA problem for the 4-step RA procedure.

In one example, when the UE performs the 2-step RA procedure (e.g., RA_TYPE is set to 2-stepRA), and the preamble transmission counter reaches to the value of 'preambleTransMax', the UE may initiate a connection re-establishment procedure (e.g., when a specific timer (e.g., T300, T301, T304, T311 and/or T319) expires or is not running), where the 'preambleTransMax' may be configured in the "RACH-ConfigGenericTwoStepRA" IE and/or in the "RACH-ConfigGeneric" IE.

In one example, when the UE performs the 2-step RA procedure (e.g., RA_TYPE is set to 2-stepRA), and the preamble transmission counter reaches to the value of 'preambleTransMax', the UE may stop (or abort) the ongoing RA procedure, where the 'preambleTransMax' may be configured in the "RACH-ConfigGenericTwoStepRA" IE and/or in the "RACH-ConfigGeneric" IE.

In one example, when the UE performs the 2-step RA procedure (e.g., RA_TYPE is set to 2-stepRA), and the preamble transmission counter reaches to the value of 'preamble TransMax' (e.g., when declaring an RA problem as mentioned previously), the UE may consider the RA procedure unsuccessfully competed (e.g., if this RA procedure is triggered for SI request), where the 'preambleTransMax' may be configured in the "RACH-ConfigGenericTwoStepRA" IE and/or in the "RACH-ConfigGeneric" IE.

More specifically, the UE may increment the value of the preamble transmission counter when a time window (e.g., msgB-ResponseWindow and/or ra-ResponseWindow) expires and/or the RAR reception has not been considered as successful, as illustrated in Table 10. Alternatively, the UE may increment the value of the preamble transmission counter if the contention resolution is considered not successful, as illustrated in Table 10.

TABLE 10

1>if msgB-ResponseWindow expires, and the Random Access Response Reception has notbeen considered as successful based on descriptions above:
  2> increment PREAMBLE TRANSMISSION COUNTER by 1;
  2> if the BWP selected for random access procedure is only configured with 2-step random access resources and if
  2> if PREAMBLE TRANSMISSION COUNTER = preamble TransMax + 1:
    3>indicate a Random Access problem to upper layers;
    3> if this Random Access procedure was triggered for SI request:
      4>consider this Random Access procedure unsuccessfully completed.
1>if the Contention Resolution is considered not successful:
  2> flush the HARQ buffer used for transmission of the MAC PDU in the Msg3 buffer;
  2>increment PREAMBLE TRANSMISSION COUNTER by 1;
  2>if PREAMBLE TRANSMISSION COUNTER = preamble TransMax + 1:
    3> indicate a Random Access problem to upper layers.
    3>if this Random Access procedure was triggered for SI request:
      4> consider the Random Access procedure unsuccessfully completed.

Specifically, the UE may apply this alternative (only) if the 'preambleTransMax' is not configured (on the active UL BWP where the 2-step RA procedure is performed). More specifically, the UE may apply this alternative (only) if the 4-step RA resources are not configured (on the active UL BWP where the 2-step RA procedure is performed). Furthermore, the UE may apply this alternative if the fallback procedure (e.g., switching to of the 4-step RA type) is not supported (even if the 4-step RA resources are configured).

In one example, when the UE performs the 2-step RA procedure (e.g., RA_TYPE is set to 2-stepRA), and the preamble transmission counter reaches to the value of 'msgA-TransMax' (and if the 'preambleTransMax' is not configured, and/or if the 4-step RA resources are not configured and/or the switching to the 4-step RA type is not supported), the lower layer (e.g., the MAC layer) of the UE may indicate an RA problem to the upper layer (e.g., the RRC layer) of the UE.

Specifically, the UE may indicate an RA problem for the 2-step RA procedure that is different from the RA problem for the 4-step RA procedure.

In one example, when the UE initiates the RA procedure on an UL BWP on a specific cell (e.g., the PCell or the PSCell) and the active UL BWP is only configured with the 2-step RA resources (e.g., if the 'preambleTransMax' is not configured in the "RACH-ConfigGenericTwoStep" IE (e.g., included in "RACH-ConfigCommonTwoStep" IE), the 4-step RA resources are not configured and/or the switching to the 4-step RA type is not supported), the UE may apply the 'preambleTransMax' configured in the "RACH-ConfigGeneric" IE (e.g., included in "RACH-ConfigCommon" IE), which may be configured for the UL BWP or for a specific (e.g., another) BWP (e.g., first ActiveUplinkBWP, initial BWP, and/or default BWP).

In one example, when the UE performs the 2-step RA procedure (e.g., RA_TYPE is set to 2-stepRA), and the preamble transmission counter reaches the value of 'msgA-TransMax' (and if the 'preambleTransMax' is not configured, the 4-step RA resources are not configured and/or the switching to the 4-step RA type is not supported), the UE may initiate a connection re-establishment procedure (e.g., when a specific timer (e.g., T300, T301, T304, T311 and/or T319) expires or is not running).

In one example, when the UE performs the 2-step RA procedure (e.g., RA_TYPE is set to 2-stepRA), and the preamble transmission counter reaches to the value of 'msgA-TransMax' (and if the 'preambleTransMax' is not configured, the 4-step RA resources are not configured and/or the switching to the 4-step RA type is not supported), the UE may stop the ongoing 2-step RA procedure.

In one example, when the UE performs the 2-step RA procedure (e.g., RA_TYPE is set to 2-stepRA), and the preamble transmission counter reaches to the value of 'msgA-TransMax' (and if the 'preambleTransMax' is not configured, the 4-step RA resources are not configured and/or the switching to the 4-step RA type is not supported), the UE may consider the 2-step RA procedure unsuccessfully completed (e.g., if this RA procedure is triggered for SI request).

The UE may compare the value of the preamble transmission counter with the value of the 'preambleTransMax' and/or 'msgA-TransMax' if the msgB-ResponseWindow expires, where the msgB-ResponseWindow may be a time window used for monitoring the MSGB. The UE may compare the value of the preamble transmission counter with the value of the 'preambleTransMax' and/or 'msgA-TransMax' if ra-ResponseWindow configured in BeamFailureRecoveryConfig expires and/or if a PDCCH transmission on the search space indicated by recovery SearchSpaceId addressed to the C-RNTI has not been received on the serving cell on which the preamble is transmitted. The UE may compare the value of the preamble transmission counter with the value of the 'preambleTransMax' and/or 'msgA-TransMax' if ra-ResponseWindow configured in the "RACH-ConfigCommon" IE expires, and/or if the RAR containing RA preamble identifiers that matches the transmitted PREAMBLE INDEX has not been received. The UE may compare the value of the preamble transmission counter with the value of the 'preambleTransMax' and/or 'msgA-TransMax' if the contention resolution of the 2-step RA procedure is considered not successful. The UE may compare the value of the preamble transmission counter with the value of the 'preambleTransMax' and/or 'msgA-TransMax' if the 2-step RA procedure is not completed.

Switching Between the 2-Step RA Type and the 4-Step RA Type

When a UE triggers (or initiates) an RA procedure, the UE may perform RA type selection at the initialization of the RA procedure based on some criterions. For example, the UE may select the RA type based on network configurations and/or RSRP threshold.

For example, the UE may set the RA type to the 2-step RA type if the CFRA resources for the 2-step RA type (e.g., MSGA) is configured by the network, or the UE may set the RA type to the 4-step RA type if the CFRA resource for 4-step for the 4-step RA type (e.g., MSG1) is configured by the network. In another example, the UE may set the RA type of the RA procedure to the 2-step RA type if the measured RSRP of the DL pathloss reference is above the RSRP threshold that is configured by the network via the RACH configuration for 2-step RA type.

If the UE sets the RA type to 2-step RA type at the initialization of the RA procedure, the UE may perform the 2-step RA procedure (e.g., set the RA type of the RA procedure to the 2-step RA type) as follows. For example, the UE may transmit the MSGA rather than the MSG1. One way to switch the RA type from the 2-step RA type to the 4-step RA type for the same RA procedure is disclosed.

The UE may be configured with a number of times 'N' (e.g., via the 'msgA-TransMax'). Thus, the UE may attempt to (re-) transmit the MSGA for 'N' times during the same RA procedure. If the number of preamble transmission (e.g., the MSGA), which may be counted by the preamble transmission counter, reaches the value of the 'msgA-TransMax', the UE may switch/set the RA type from the 2-step RA type to the 4-step RA type.

It is noted that the UE may determine whether to switch/set the RA type from the 2-step RA type to the 4-step RA type based on the 'msgA-TransMax'. If the 'msgA-TransMax' is configured, the UE may compare the value of the preamble transmission counter with the 'msgA-TransMax' to determine whether to switch/set the RA type from the 2-step RA type to the 4-step RA type at each attempt of the RA procedure. However, the UE may be configured with only 2-step RA resources (e.g., no RA resource for the 4-step RA procedure is configured) on the UL BWP where the 2-step RA procedure is initiated. In this case, the UE may not switch/set the RA type from the 2-step RA type to the 4-step RA type (even if the value of the preamble transmission counter reaches to the value of 'msgA-TransMax'). In this case, the UE may not apply the 'msgA-TransMax'. In this case, the field of 'msgA-TransMax' may be absent.

The 2-step RA resources may be configured for a BWP but the 4-step RA resources may not be configured for the BWP. The 2-step RA resources and/or the 4-step RA resources may be configured per (UL) BWP.

In one example, the UE may determine whether to switch/set the RA type from the 2-step RA type to the 4-step RA type according to whether the 4-step RA resources are configured (different from considering the 'msgA-TransMax' and the preamble transmission counter as mentioned above).

For example, if a BWP for a UE is configured with the 2-step RA resources, and the BWP is not configured with the 4-step RA resources, the UE may perform the 2-step RA procedure (e.g., the RA_TYPE is set to 2-stepRA). During each attempt of the 2-step RA procedure (e.g., if the 2-step RA procedure is not completed), the UE may determine whether to switch the RA type (e.g., set the RA_TYPE to 4-stepRA) based on whether the 4-step RA resources are configured or not. For example, the UE may switch the RA type (e.g., set the RA_TYPE to 4-stepRA) only if the 4-step RA resources are configured. In other words, the UE may switch the RA type (e.g., set the RA_TYPE to 4-stepRA) if both the 4-step RA resources and the 2-step RA resources are configured. For another example, the UE may apply the 'msgA-TransMax' only if the 4-step RA resources are configured. In other words, the UE may apply the 'msgA-TransMax' if both the 4-step RA resources and the 2-step RA resources are configured. The UE may not switch the RA type if the 4-step RA resources are not configured. The UE may not apply the 'msgA-TransMax' if the 4-step RA resources are not configured. Any one or more of the following examples may be applied concurrently.

In one example, as illustrated in Table 11, if the 'msgA-TransMax' is configured and PREAMBLE_TRANSMISSION_COUNTER=msgA-TransMax+1, and/or if the BWP selected for RA procedure is configured with the 4-step RA resources, the UE may switch/set the RA_TYPE to 4-stepRA. Thus, the UE may perform the 4-step RA procedure in the following attempt of the RA procedure. In another example, if the 'msgA-TransMax' is configured and PREAMBLE_TRANSMISSION_COUNTER=msgA-TransMax+1, and/or if the BWP selected for RA procedure is not configured with the 4-step RA resources, the UE may not set the RA_TYPE to 4-stepRA. Thus, the UE may perform the 2-step RA procedure.

TABLE 11

1> if msgB-ResponseWindow expires, and the Random Access
Response Reception has not been considered as successful based
on descriptions above:
  [ . . . ]
  2>if the Random Access procedure is not completed:
    3> select a random backoff time according to a uniform
      distribution between 0 and the PREAMBLE BACKOFF;
    3> if the active UL BWP is configured with 4-step RA resource
      and if msgA-TransMax is configured, and PREAMBLE
      TRANSMISSION COUNTER = msgA-TransMax + 1; or
    3> if the BWP selected for RA procedure is configured with 4-
      step RA resource and if msgA-TransMax is configured, and
      PREAMBLE_TRANSMISSION_COUNTER = msgA-
      TransMax + 1:
      4> set the RA TYPE to 4-stepRA;
        [ . . . ]
      4> perform the Random Access Resource selection procedure
        as specified in subclause 5.1.2.
    3> else:
      4> perform the Random Access Resource selection procedure
        for 2-step random access (see subclause 5.1.2a) after the
        backoff time.
1>if the Contention Resolution is considered not successful:
  [ . . . ]
  2>if the Random Access procedure is not completed:
    3> select a random backoff time according to a uniform
      distribution between 0 and the PREAMBLE BACKOFF;
    3>if the criteria (as defined in clause 5.1.2) to select contention-
      free Random Access Resources is met during the backoff time:
      4> perform the Random Access Resource selection procedure TABLE 11-continued (see clause 5.1.2);
3>else if the RA_TYPE is set to 2-stepRA:
    4> if active UL BWP is configured with 4-step RA resource and if msgA-TransMax is configured and PREAMBLE_TRANSMISSION_COUNTER = msgA-TransMax + 1; or
    4> if the BWP selected for RA procedure is configured with 4-step RA resource and if msgA-TransMax is configured and PREAMBLE_TRANSMISSION_COUNTER = msgA-TransMax + 1:
        5> set the RA TYPE to 4-stepRA;
        [ . . . ]
        5> perform the Random Access Resource selection as specified in subclause 5.1.2.
    4> else:
        5> perform the Random Access Resource selection for 2-step random access procedure (see clause 5.1.2a) after the backoff time.

In one example, if the 'msgA-TransMax' is configured and PREAMBLE_TRANSMISSION_COUNTER=msgA-TransMax+1, and/or if the BWP selected for RA procedure is configured with the 4-step RA resources, the UE may perform the Random Access Resource selection for the 4-step RA procedure (after the backoff time). In another example, if the msgA-TransMax is configured and PREAMBLE_TRANSMISSION_COUNTER=msgA-TransMax+1, and/or if the BWP selected for RA procedure is not configured with 4-step RA resources, the UE may perform the Random Access Resource selection for the 2-step RA procedure (after the backoff time).

In one example, if the 'msgA-TransMax' is configured and PREAMBLE_TRANSMISSION_COUNTER=msgA-TransMax+1, and/or if the BWP selected for RA procedure is not configured with the 4-step RA resources, the UE may perform BWP switching to a BWP configured with the 4-step RA resources (e.g., an initial BWP and/or a default BWP).

In one example, if the 'msgA-TransMax' is configured and PREAMBLE_TRANSMISSION_COUNTER=msgA-TransMax+1, and/or if the BWP selected for RA procedure is not configured with the 4-step RA resources, the UE may initiate a (new) RA procedure on the BWP configured with the 4-step RA resources (e.g., an initial BWP and/or a default BWP). In some implementations, the network may not configure 'msgA-TransMax' for a BWP if the network does not configure the 4-step RA resources for the BWP. In one example, the field of 'msgA-TransMax' may be absent if the network does not configure the 4-step RA resources for the BWP. More specifically, the configuration of 'msgA-TransMax' may be optional If the network does not configure the 4-step RA resources for the BWP (e.g., the network does not configure the RACH-ConfigGeneric IE and/or the RACH-ConfigCommon IE in the "BWP-UplinkCommon" IE), the network may not configure 'msgA-TransMax' for the BWP (e.g., the network does not configure 'msgA-TransMax' in the "RACH-ConfigGenericTwoStepRA" IE or the field of 'msgA-TransMax' is absent). Specifically, the UE may not apply the 'msgA-TransMax' if the 'msgA-TransMax' is not configured. More specifically, if the 'msgA-TransMax' is not configured for a BWP, the UE may not (be allowed to) switch/set the RA type from 2-step RA type to 4-step RA type during the RA procedure on the BWP.

In one example, if the UE is not configured with the 4-step RA resources for the BWP (e.g., the UE is not configured with RACH-ConfigCommon and/or RACH—ConfigGeneric in the "BWP-UplinkCommon" IE), the UE may ignore or not may apply the 'msgA-TransMax' (e.g., even if the 'msgA-TransMax' is configured). Specifically, the field of 'msgA-TransMax may only be applicable when 2-step and 4-step RA type are configured and switching to 4-step RA type is supported.

In some implementations, the network may configure the value of 'msgA-TransMax' as infinity for a BWP if the network does not configure the 4-step RA resources for the BWP. If the network does not configure the 4-step RA resources for the BWP (e.g., the network does not configure RACH-ConfigCommon and/or RACH-ConfigGeneric in the "BWP-UplinkCommon" IE), the network may configure the value of 'msgA-TransMax' as infinity for the BWP.

In one example, as illustrated in Table 12, if the UE is not configured with the 4-step RA resources for the BWP (e.g., the UE is not configured with rach-ConfigCommon and/or RACH-ConfigGeneric in the "BWP-UplinkCommon" IE), the UE may consider the 'msgA-TransMax' as infinity.

In other implementations, both the 2-step RA resources and the 4-step RA resources may be configured for a BWP.

In one example, the network may control (e.g., via a RACH configuration) whether the UE may switch the RA type from the 2-step RA type to 4-step RA type (e.g., whether the switching from 2-step RA type to 4-step RA type is allowed) in a case that the 2-step RA resources and the 4-step RA resources are both configured on the BWP. In one example, the network may configure a specific indication (e.g., a flag) to indicate whether the UE may switch the RA type or not. In other words, the UE may determine whether to switch RA type during an RA procedure based on the specific indication for switching the RA type. For example, if the specific indication for switching the RA type is set to true, the UE may switch the RA type from the 2-step type to the 4-step type (e.g., if other criterions for RA type switching are satisfied). On the contrary, if the specific indication for switching the RA type is set to false, the UE may not switch the RA type from the 2-step type to the 4-step type (e.g., even if other criterions for RA type switching are satisfied).

In one example, if the 'msgA-TransMax' is configured and PREAMBLE_TRANSMISSION_COUNTER=msgA-TransMax+1, the UE may set the RA_TYPE to 4-stepRA if the specific indication for switching the RA type is set to true. On the contrary, if the 'msgA-TransMax' is configured and PREAMBLE_TRANSMISSION_COUNTER=msgA-TransMax+1, the UE may not set the RA_TYPE to 4-stepRA if the specific indication for switching the RA type is set to false.

In one example, the UE may determine whether to switch the RA type of an RA procedure from the 2-step type to the 4-step type based on whether the value of the 'msgA-TransMax' is infinity or not. In other words, the network may indicate the UE not to switch the RA type during the RA procedure on a BWP by configuring the 'msgA-TransMax' as infinity for the BWP.

In one example, if the 'msgA-TransMax' is configured and PREAMBLE_TRANSMISSION_COUNTER=msgA-TransMax+1, the UE may not set the RA_TYPE to 4-stepRA if the 'msgA-TransMax' is set as infinity.

In one example, the UE may determine whether to switch the RA type of an RA procedure from the 2-step type to the 4-step type based on whether the 'msgA-TransMax' is absent or not. In other words, the network may indicate the UE not to switch the RA type during the RA procedure on a BWP by configuring the 'msgA-TransMax' as absent for the BWP.

In one example, the UE may determine whether to switch the RA type of an RA procedure from the 2-step type to the 4-step type based on whether the 'msgA-TransMax' is applied by the UE or not.

Figure 3:
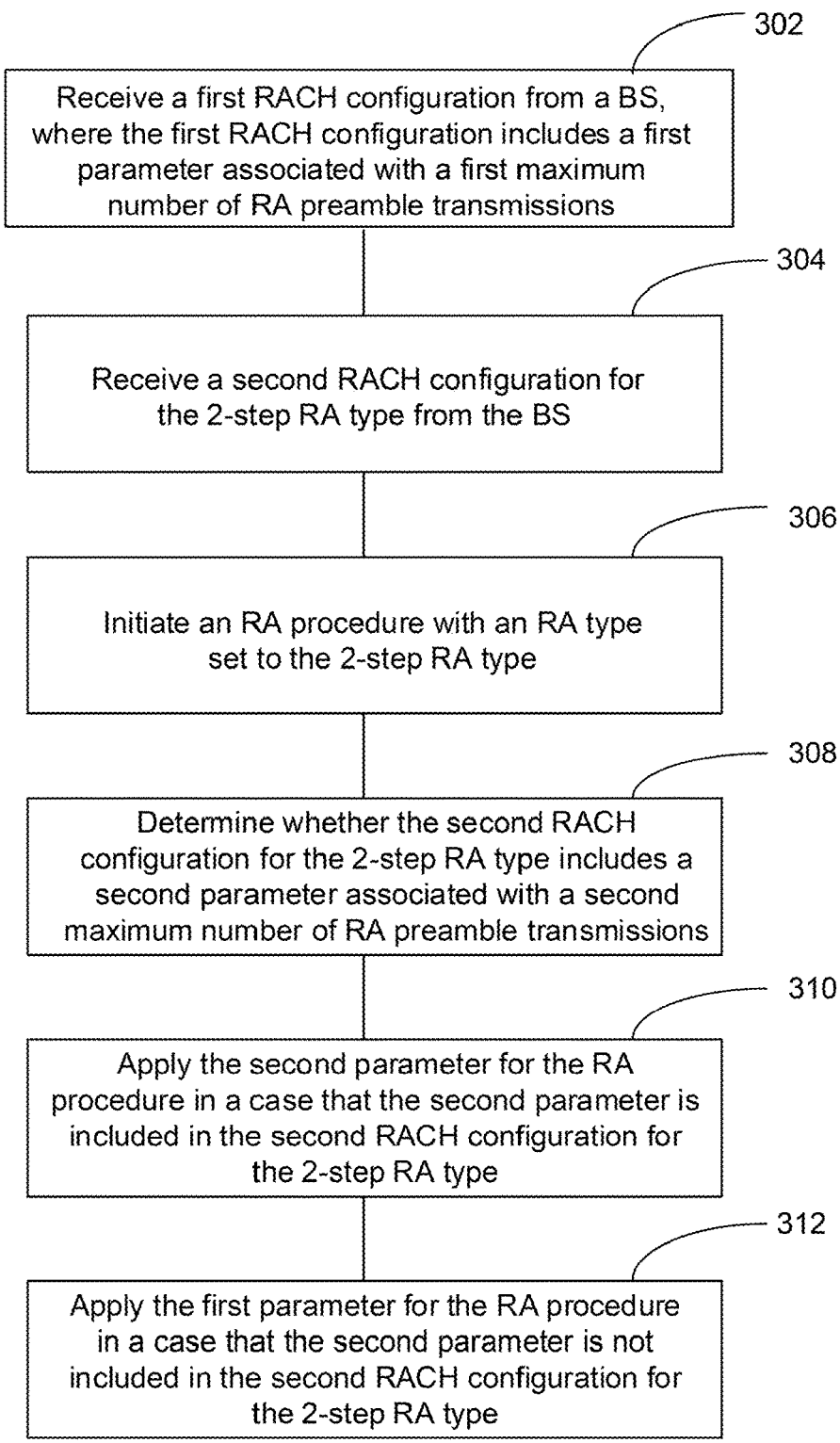
FIG. 3 is a flowchart illustrating a method for RA, according to an implementation of the present disclosure.

FIG. 3 is a flowchart illustrating a method 300 for RA (e.g., the 2-step RA type or the 4-step RA type), according to an implementation of the present disclosure. In action 302, the UE receives a first RACH configuration (e.g., "RACH-ConfigCommon" IE and/or "RACH-ConfigGeneric" IE) from a BS, where the first RACH configuration includes a first parameter associated with a first maximum number of RA preamble transmissions (e.g., a first 'preambleTranxMax'). In action 304, the UE receives a second RACH configuration for the 2-step RA type (e.g., "RACH-ConfigCommonTwoStepRA" IE and/or "RACH-ConfigGenericTwoStepRA" IE) from the BS. In action 306, the UE initiates an RA procedure with an RA type set to the 2-step RA type. In action 308, the UE determines whether the second RACH configuration for the 2-step RA type includes a second parameter associated with a second maximum number of RA preamble transmissions (e.g., a second 'preambleTranxMax'). In action 310, the UE applies the second parameter (e.g., the second 'preambleTranxMax') for the RA procedure in a case that the second parameter is included in the second RACH configuration for the 2-step RA type. In action 312, the UE applies the first parameter (e.g., the first 'preambleTranxMax') for the RA procedure in a case that the second parameter is not included in the second RACH configuration for the 2-step RA type.

Figure 4:
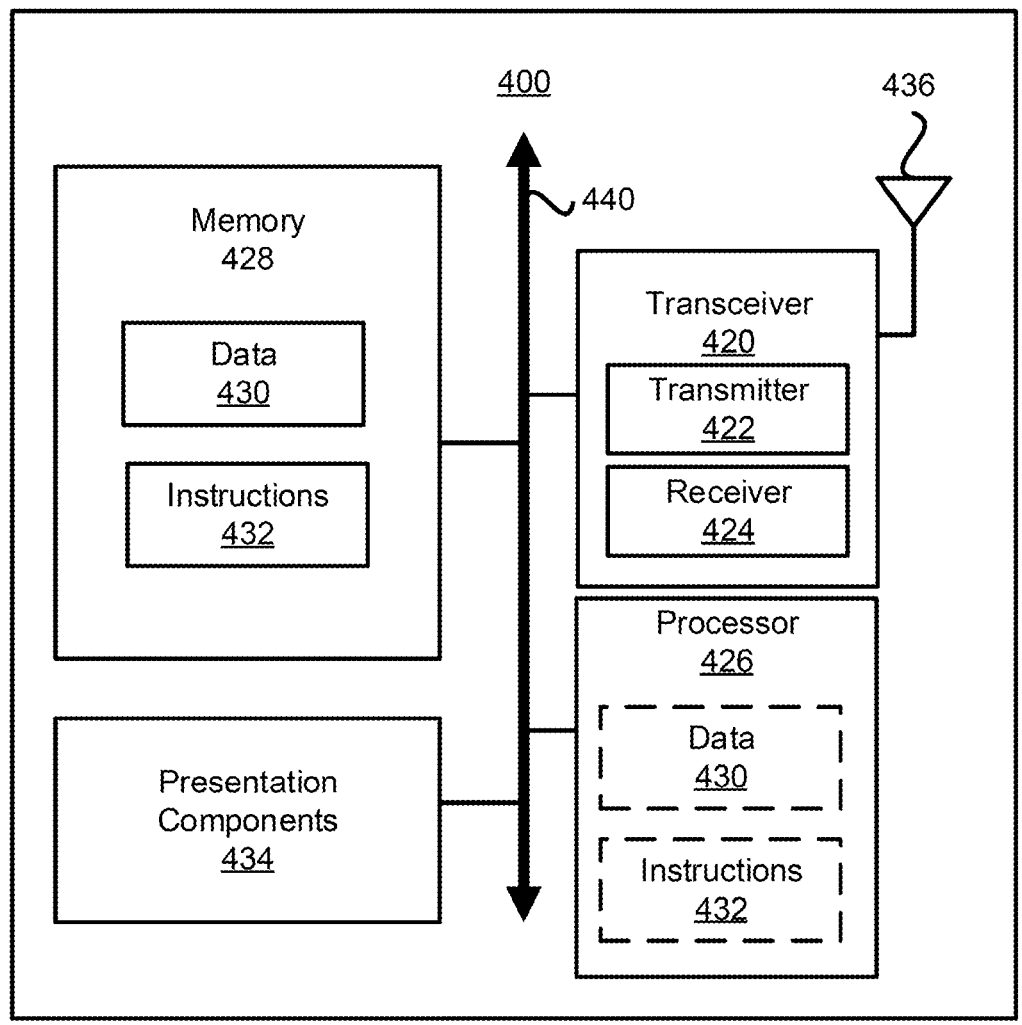
FIG. 4 is a block diagram illustrating a node for wireless communication, according to an implementation of the present disclosure.

FIG. 4 is a block diagram illustrating a node 400 for wireless communication, according to an implementation of the present disclosure.

As illustrated in FIG. 4, the node 400 may include a transceiver 420, a processor 426, a memory 428, one or more presentation components 434, and at least one antenna 436. The node 400 may also include a Radio Frequency (RF) spectrum band module, a BS communications module, a network communications module, and a system communications management module, input/output (I/O) ports, I/O components, and a power supply (not illustrated in FIG. 4).

Each of these components may be in communication with each other, directly or indirectly, over one or more buses 440. The node 400 may be a UE or a BS that performs various disclosed functions illustrated in FIG. 3.

The transceiver 420 may include a transmitter 422 (with transmitting circuitry) and a receiver 424 (with receiving circuitry) and may be configured to transmit and/or receive time and/or frequency resource partitioning information. The transceiver 420 may be configured to transmit in different types of subframes and slots including, but not limited to, usable, non-usable and flexibly usable subframes and slot formats. The transceiver 420 may be configured to receive data and control channels.

The node 400 may include a variety of computer-readable media. Computer-readable media may be any media that can be accessed by the node 400 and include both volatile (and non-volatile) media, removable (and non-removable) media. Computer-readable media may include computer storage media and communication media. Computer storage media may include both volatile (and/or non-volatile), as well as removable (and/or non-removable) media implemented according to any method or technology for storage of information such as computer-readable media.

Computer storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media do not include a propagated data signal.

Communication media may typically embody computer-readable instructions, data structures, program modules or other data in a modulated data signal such as a carrier wave or other transport mechanisms and include any information delivery media. The term "modulated data signal" may mean a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the disclosed media should be included within the scope of computer-readable media.

The memory 428 may include computer-storage media in the form of volatile and/or non-volatile memory. The memory 428 may be removable, non-removable, or a combination thereof. For example, the memory 428 may include solid-state memory, hard drives, optical-disc drives, etc. As illustrated in FIG. 4, the memory 428 may store computer-readable and/or computer-executable instructions 432 (e.g., software codes) that are configured to, when executed, cause the processor 426 (e.g., processing circuitry) to perform various disclosed functions. Alternatively, the instructions 432 may not be directly executable by the processor 426 but may be configured to cause the node 400 (e.g., when compiled and executed) to perform various disclosed functions.

The processor 426 may include an intelligent hardware device, a central processing unit (CPU), a microcontroller, an ASIC, etc. The processor 426 may include memory. The processor 426 may process the data 430 and the instructions 432 received from the memory 428, and information through the transceiver 420, the baseband communications module, and/or the network communications module. The processor 426 may also process information to be sent to the transceiver 420 for transmission via the antenna 436, to the network communications module for transmission to a CN.

One or more presentation components 434 may present data to a person or other devices. Presentation components 434 may include a display device, a speaker, a printing component, a vibrating component, etc.

From the present disclosure, it is evident that various techniques can be utilized for implementing the disclosed concepts without departing from the scope of those concepts. Moreover, while the concepts have been disclosed with specific reference to specific implementations, a person of ordinary skill in the art would recognize that changes can be made in form and detail without departing from the scope of those concepts. As such, the present disclosure is to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method for a Random Access (RA) procedure performed by a User Equipment (UE), the method comprising:
receiving a first Random Access Channel (RACH) configuration for a 4-step RA type from a Base Station (BS), the first RACH configuration including a first parameter indicating a first maximum number of RA preamble transmissions;

receiving a second RACH configuration for a 2-step RA type from the BS;
initiating an RA procedure with an RA type set to the 2-step RA type;
determining whether the second RACH configuration includes a second parameter indicating a second maximum number of RA preamble transmissions;
applying the second parameter, which is associated with the 2-step RA type, for the RA procedure with the 2-step RA type in a case that the second parameter is included in the second RACH configuration;
applying the first parameter, which is associated with the 4-step RA type, for the RA procedure with the 2-step RA type in a case that the second parameter is not included in the second RACH configuration;
indicating an RA problem, by a Medium Access Control (MAC) entity of the UE to a Radio Resource Control (RRC) entity of the UE, in a case that the first parameter is applied and a value of a preamble transmission counter reaches the first maximum number of RA preamble transmissions;
indicating the RA problem, by the MAC entity of the UE to the RRC entity of the UE, in a case that the second parameter is applied and the value of the preamble transmission counter reaches the second maximum number of RA preamble transmissions;
determining whether the second RACH configuration includes a third parameter indicating a third maximum number of RA preamble transmissions for the RA procedure;
applying the third parameter for the RA procedure in a case of one or more conditions being satisfied, wherein the one or more conditions comprise a first condition that the third parameter is included in the second RACH configuration; and
performing a Bandwidth Part (BWP) switching procedure to switch to a first BWP configured with a 4-step RA resource in a case that the third parameter is applied, the value of the preamble transmission counter reaches the third maximum number of RA preamble transmissions, and a second BWP selected for the RA procedure is not configured with any 4-step RA resource.

2. The method of claim 1, further comprising:
setting the value of the preamble transmission counter to an initial value when the RA procedure is initiated; and
incrementing the value of the preamble transmission counter when a time window expires, wherein the time window is a time period for the UE to monitor an RA response of the RA procedure.

3. The method of claim 1, wherein the RA procedure is triggered for a System Information (SI) request, the method further comprising determining that the RA procedure is unsuccessfully completed after the RA problem is indicated.

4. The method of claim 1, further comprising determining that a radio link failure is detected after the RA problem is indicated.

5. The method of claim 1, further comprising applying the second parameter for the RA procedure in a case that the first parameter and the second parameter are both configured to the UE.

6. The method of claim 1, further comprising:
setting the RA type to the 4-step RA type in a case that the third parameter is applied and the value of the preamble transmission counter reaches the third maximum number of RA preamble transmissions; and
forgoing setting the RA type to the 4-step RA type in a case that the third parameter is not applied or the value of the preamble transmission counter does not reach the third maximum number of RA preamble transmissions.

7. The method of claim 1, wherein the one or more conditions further comprise a second condition that the 4-step RA resource is configured in the first RACH configuration and a third condition that a 2-step RA resource is configured in the second RACH configuration.

8. The method of claim 1, further comprising:
considering the third parameter as infinite in a case that the third parameter is applied and the 4-step RA resource is not configured in the first RACH configuration.

9. A user equipment (UE) for performing a Random Access (RA) procedure, the UE comprising:
at least one processor; and
at least one non-transitory computer-readable medium coupled to the at least one processor and storing one or more computer-executable instructions that, when executed by the at least one processor, cause the UE to:
receive a first Random Access Channel (RACH) configuration for a 4-step RA type from a Base Station (BS), the first RACH configuration including a first parameter indicating a first maximum number of RA preamble transmissions;
receive a second RACH configuration for a 2-step RA type from the BS;
initiate an RA procedure with an RA type set to the 2-step RA type;
determine whether the second RACH configuration includes a second parameter indicating a second maximum number of RA preamble transmissions;
apply the second parameter, which is associated with the 2-step RA type, for the RA procedure with the 2-step RA type in a case that the second parameter is included in the second RACH configuration;
apply the first parameter, which is associated with the 4-step RA type, for the RA procedure with the 2-step RA type in a case that the second parameter is not included in the second RACH configuration;
indicate an RA problem, by a Medium Access Control (MAC) entity of the UE to a Radio Resource Control (RRC) entity of the UE, in a case that the first parameter is applied and a value of a preamble transmission counter reaches the first maximum number of RA preamble transmissions;
indicate the RA problem, by the MAC entity of the UE to the RRC entity of the UE, in a case that the second parameter is applied and the value of the preamble transmission counter reaches the second maximum number of RA preamble transmissions;
determine whether the second RACH configuration includes a third parameter indicating a third maximum number of RA preamble transmissions for the RA procedure;
apply the third parameter for the RA procedure in a case of one or more conditions being satisfied, wherein the one or more conditions comprise a first condition that the third parameter is included in the second RACH configuration; and
perform a Bandwidth Part (BWP) switching procedure to switch to a first BWP configured with a 4-step RA resource in a case that the third parameter is applied, the value of the preamble transmission counter reaches the third maximum number of RA preamble transmissions, and a second BWP selected for the RA procedure is not configured with any 4-step RA resource.

10. The UE of claim 9, wherein the one or more computer-executable instructions, when executed by the at least one processor, further cause the UE to:
set the value of the preamble transmission counter to an initial value when the RA procedure is initiated; and
increment the value of the preamble transmission counter when a time window expires, wherein the time window is a time period for the UE to monitor an RA response of the RA procedure.

11. The UE of claim 9, wherein the RA procedure is triggered for a System Information (SI) request and the one or more computer-executable instructions, when executed by the at least one processor, further cause the UE to:
determine that the RA procedure is unsuccessfully completed after the RA problem is indicated.

12. The UE of claim 11, wherein the one or more computer-executable instructions, when executed by the at least one processor, further cause the UE to:
determine that a radio link failure is detected after the RA problem is indicated.

13. The UE of claim 9, wherein the one or more computer-executable instructions, when executed by the at least one processor, further cause the UE to:
apply the second parameter for the RA procedure in a case that the first parameter and the second parameter are both configured to the UE.

14. The UE of claim 9, wherein the one or more computer-executable instructions, when executed by the at least one processor, further cause the UE to:
set the RA type to the 4-step RA type in a case that the third parameter is applied and the value of the preamble transmission counter reaches the third maximum number of RA preamble transmissions; and
forgo setting the RA type to the 4-step RA type in a case that the third parameter is not applied or the value of the preamble transmission counter does not reach the third maximum number of RA preamble transmissions.

15. The UE of claim 9, wherein the one or more conditions further comprise a second condition that the 4-step RA resource is configured in the first RACH configuration and a third condition that a 2-step RA resource is configured in the second RACH configuration.

16. The UE of claim 9, wherein the one or more computer-executable instructions, when executed by the at least one processor, further cause the UE to:
consider the third parameter as infinite in a case that the third parameter is applied and the 4-step RA resource is not configured in the first RACH configuration.

* * * * *